US009569704B2

United States Patent
Takeuchi

(10) Patent No.: US 9,569,704 B2
(45) Date of Patent: Feb. 14, 2017

(54) PRINT TARGET DATA PROCESSING APPARATUS, PRINT TARGET DATA PROCESSING METHOD, AND STORAGE MEDIUM, WHICH CONTROL DIVISION INTO PLURAL PRINT MEDIA

(71) Applicant: CASIO COMPUTER CO., LTD., Tokyo (JP)

(72) Inventor: Makoto Takeuchi, Kokubunji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 15 days.

(21) Appl. No.: 13/960,473

(22) Filed: Aug. 6, 2013

(65) Prior Publication Data

US 2014/0063512 A1   Mar. 6, 2014

(30) Foreign Application Priority Data

Sep. 5, 2012 (JP) ................................ 2012-194898
Jan. 28, 2013 (JP) ................................ 2013-013005

(51) Int. Cl.
*G06K 15/02* (2006.01)
*G06F 3/12* (2006.01)
(Continued)

(52) U.S. Cl.
CPC ......... *G06K 15/1843* (2013.01); *G06F 3/1208* (2013.01); *G06F 3/1244* (2013.01);
(Continued)

(58) Field of Classification Search
CPC .. G06K 15/1843; G06F 3/1244; G06F 3/1252; G06F 3/1208
(Continued)

(56) References Cited

U.S. PATENT DOCUMENTS 5,023,728 A * 6/1991 Nimura .............. H04N 1/00411
                                                    346/104
5,389,476 A * 2/1995 Kruchko .................. B41M 3/12
                                                    101/DIG. 36
(Continued)

FOREIGN PATENT DOCUMENTS

JP   2002040568 A   2/2002
JP   2003-244501 A   8/2003
(Continued)

OTHER PUBLICATIONS

Korean Office Action dated Jul. 4, 2014 in counterpart Korean Application No. 10-2013-0106330.
(Continued)

*Primary Examiner* — Benjamin O Dulaney
(74) *Attorney, Agent, or Firm* — Holtz, Holtz & Volek PC

(57) ABSTRACT

An imaging apparatus includes: an image obtaining unit which obtains print target data to be printed; a second print size specifying unit which specifies a print size for printing the obtained print target image on one or more print media; a print medium size specifying unit which specifies a size of the print media on which the print target data is printed; and a division judging unit which judges whether or not the print target data is divided into the plural print media when being printed, on the basis of the specified print size and the specified size of the print media.

16 Claims, 8 Drawing Sheets

(51) Int. Cl.
*G06T 3/40* (2006.01)
*G06T 7/60* (2006.01)

(52) U.S. Cl.
CPC .......... *G06F 3/1252* (2013.01); *G06F 3/1285* (2013.01); *G06T 3/40* (2013.01); *G06T 7/60* (2013.01); *G06T 2207/10004* (2013.01)

(58) Field of Classification Search
USPC ........................................................ 358/1.2
See application file for complete search history.

(56) References Cited

U.S. PATENT DOCUMENTS

| | | | | |
|---|---|---|---|---|
| 6,222,949 | B1* | 4/2001 | Nakata | H04N 1/32561 358/451 |
| 2007/0146503 | A1* | 6/2007 | Shiraki | H04N 3/1593 348/231.3 |
| 2008/0094461 | A1* | 4/2008 | Terada | B41J 3/60 347/104 |
| 2009/0185241 | A1* | 7/2009 | Nepomniachtchi | G06K 9/36 358/474 |
| 2009/0279110 | A1* | 11/2009 | Ito | G06K 1/121 358/1.5 |
| 2011/0066685 | A1* | 3/2011 | Kitada | H04L 12/584 709/206 |
| 2011/0170132 | A1* | 7/2011 | Mori | G06F 3/1205 358/1.15 |
| 2012/0086652 | A1* | 4/2012 | Kim | G06F 3/1205 345/173 |
| 2012/0140279 | A1* | 6/2012 | Takasaki | H04N 1/00411 358/1.15 |

FOREIGN PATENT DOCUMENTS

| | | |
|---|---|---|
| JP | 2004289660 A | 10/2004 |
| JP | 2005223676 A | 8/2005 |
| JP | 2005-354331 A | 12/2005 |
| JP | 2005354331 A | 12/2005 |
| JP | 2006-256114 A | 9/2006 |
| JP | 2009-135578 A | 6/2009 |
| JP | 2009210782 A | 9/2009 |
| JP | 2011210013 A | 10/2011 |
| JP | 2012019369 A | 1/2012 |

OTHER PUBLICATIONS

Japanese Office Action (and English translation thereof) dated Oct. 4, 2016, issued in counterpart Japanese Application No. 2015-115428.

* cited by examiner

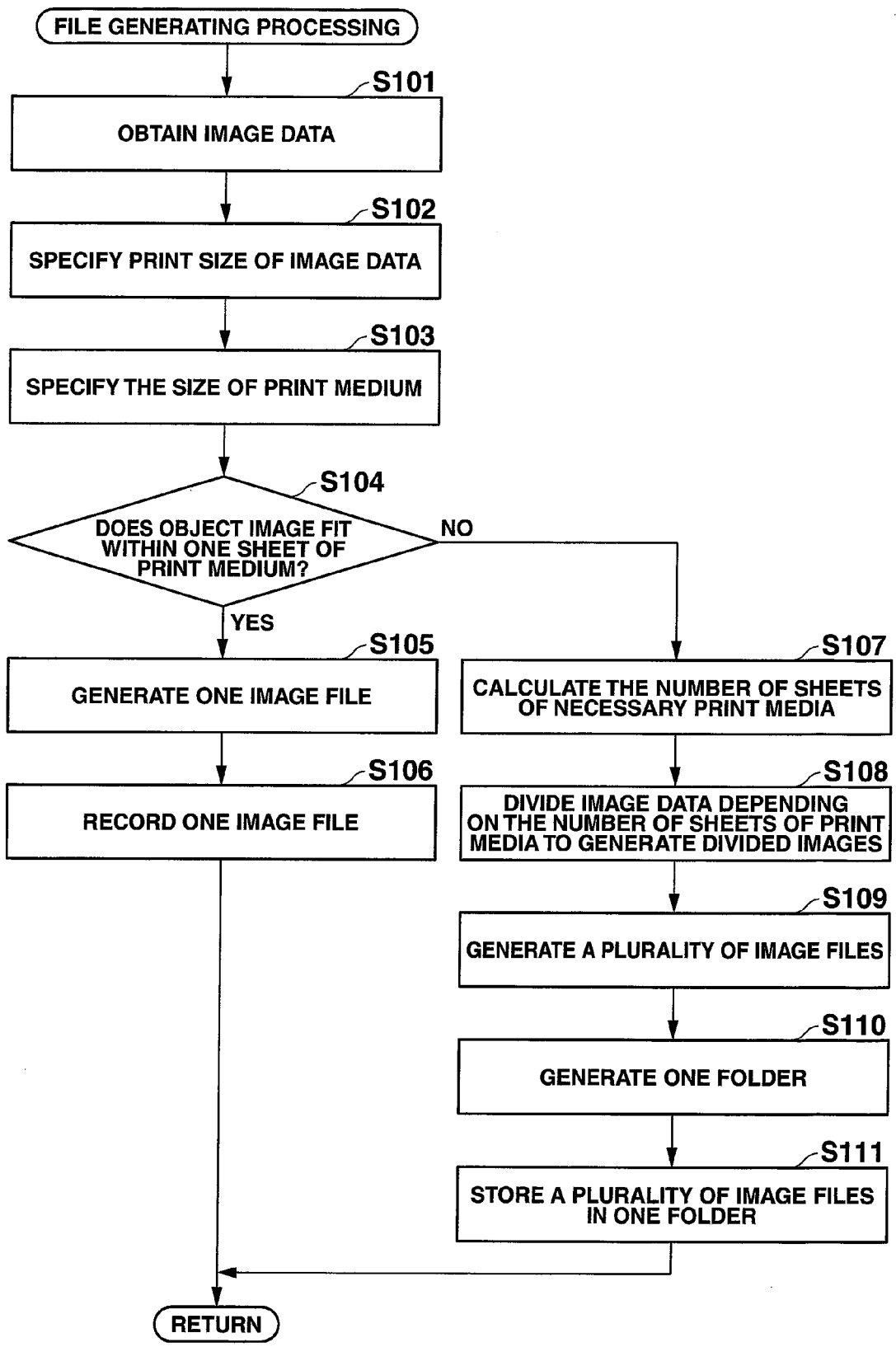

PRINT TARGET DATA PROCESSING APPARATUS, PRINT TARGET DATA PROCESSING METHOD, AND STORAGE MEDIUM, WHICH CONTROL DIVISION INTO PLURAL PRINT MEDIA

CROSS-REFERENCE TO RELATED APPLICATIONS

This application is based upon and claims the benefit of priority from the prior Japanese Patent Application No. 2012-194898 filed on Sep. 5, 2012, and the prior Japanese Patent Application No. 2013-013005 filed on Jan. 28, 2013, the entire contents of which are incorporated herein by reference.

BACKGROUND OF THE INVENTION

1. Field of the Invention

The present invention relates to a print target data processing apparatus, a print target data processing method, and a storage medium.

2. Description of the Related Art

Heretofore, a technique to output an imaged object in an arbitrarily specified magnification ratio and size has been proposed as described in Japanese Patent Application Laid-Open Publication No. 2003-244501.

SUMMARY OF THE INVENTION

According to an aspect of the present invention, a print target data processing apparatus includes: an obtaining section to obtain print target data which is to be printed; a first specifying section to specify a print size for printing the print target data obtained by the obtaining section on one or more print media; a second specifying section to specify a size of the print media on which the print target data is printed; a judging section to judge whether or not the print target data is divided into the plural print media when being printed, on the basis of the print size specified by the first specifying section and the size of the print media specified by the second specifying section.

According to an aspect of the present invention, print target data processing apparatus includes: an obtaining section to obtain print target data which is to be printed; a first specifying section to specify a print size for printing the print target data obtained by the obtaining section on one or more print media; and a second specifying section to specify a size of the one print medium within which the print target data can be printed in the print size specified by the first specifying section.

According to an aspect of the present invention, a method for processing print target data by using a print target data processing apparatus includes: an obtaining processing to obtain print target data which is to be printed; a first specifying processing to specify a print size for printing the print target data obtained by the obtaining processing on one or more print media; a second specifying processing to specify a size of the print media on which the print target data is printed; and a judging processing to judge whether or not the print target data is divided into the plural print media when being printed, on the basis of the print size specified by the first specifying processing and the size of the print media specified by the second specifying processing.

According to an aspect of the present invention, a computer readable storage medium stores a program for causing a computer of a print target data processing apparatus to exert: an obtaining function to obtain print target data which is to be printed; a first specifying function to specify a print size for printing the print target data obtained by the obtaining function on one or more print media; a second specifying function to specify a size of the print media on which the print target data is printed; and a judging function to judge whether or not the print target data is divided into the plural print media when being printed, on the basis of the print size specified by the first function and the size of the print media specified by the second function.

BRIEF DESCRIPTION OF THE DRAWINGS

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention, in which drawings:

FIG. 8 is a flowchart illustrating an example of an operation relevant to the file generating processing by the imaging apparatus illustrated in FIG. 7.

DETAILED DESCRIPTION OF THE PREFERRED EMBODIMENTS

Hereinafter, illustrative embodiments of the present invention will be described with reference to drawings. In this regard, however, the scope of the present invention is not limited to illustrated examples.

First Embodiment

Figure 1:
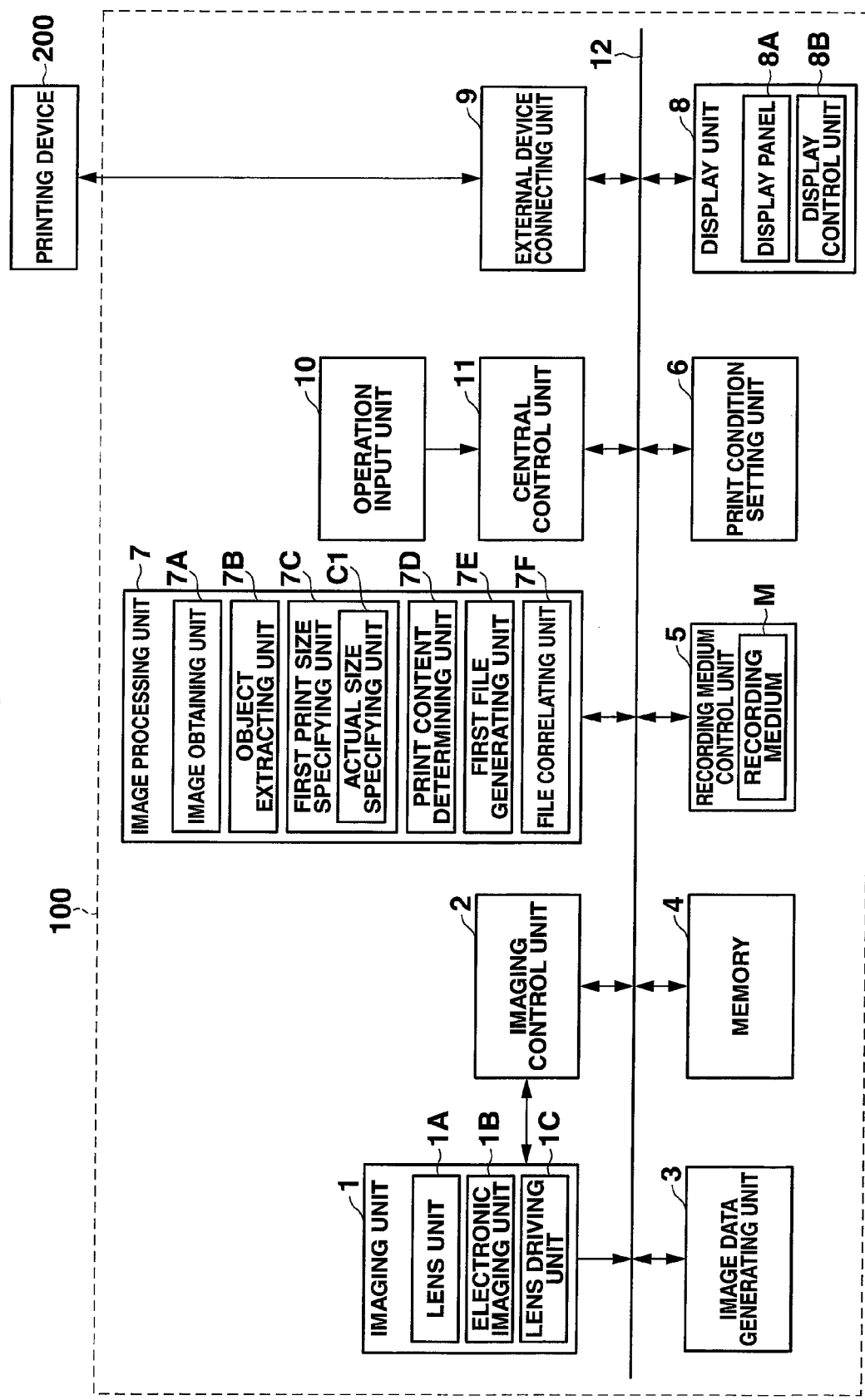
FIG. 1 is a block diagram illustrating a schematic configuration of an imaging apparatus according to a first embodiment to which the present invention is applied.

FIG. 1 is a block diagram illustrating a schematic configuration of an imaging apparatus 100 according to a first embodiment to which the present invention is applied.

As illustrated in FIG. 1, the imaging apparatus 100 according to the first embodiment specifically includes: an imaging unit 1; an imaging control unit 2; an image data generating unit 3; a memory 4; a recording medium control unit 5; a print condition setting unit 6; an image processing unit 7; a display unit 8; an external device connecting unit 9; an operation input unit 10; and a central control unit 11.

These imaging unit 1, imaging control unit 2, image data generating unit 3, memory 4, recording medium control unit 5, print condition setting unit 6, image processing unit 7, display unit 8, external device connecting unit 9 and central control unit 11 are connected to one another though a bus line 12.

The imaging unit 1 images a predetermined object (for example, human being etc.) to generate a frame image.

Concretely, the imaging unit 1 is equipped with a lens unit 1A, an electronic imaging unit 1B, and a lens driving unit 1C.

The lens unit 1A is composed of a plurality of lenses such as a zoom lens and a focus lens, for example.

The electronic imaging unit 1B is composed of an image sensor (imaging element) such as a Charge Coupled Device (CCD) and Complementary Metal oxide Semiconductor (CMOS), for example. The electronic imaging unit 1B converts an optical image which has passed through various lenses of the lens unit 1A into a two-dimensional image signal.

The lens driving unit 1C includes, though illustrations are omitted, a zoom driving unit which causes the zoom lens to move along an optical axis, a focusing driving unit which causes the focus lens to move along the optical axis, and so on.

The imaging unit 1 can be equipped with a diaphragm (not illustrated) which adjusts an amount of light passing through the lens unit 1A, in addition to the lens unit 1A, the electronic imaging unit 1B and the lens driving unit 1C.

The imaging control unit 2 controls imaging of a specific object by the imaging unit 1. Concretely, though illustrations are omitted, the imaging control unit 2 is equipped with a timing generator, a driver, and so on. The imaging control unit 2 drives, by using the timing generator and the driver, the electronic imaging unit 1B to perform scanning, and to convert the optical image which has passed through the lens unit 1A into the two-dimensional image signal at predetermined intervals. The imaging control unit 2 also causes the frame image of each screen to be read out from an imaging region of the electronic imaging unit 1B so as to be output to the image data generating unit 3.

The imaging control unit 2 can cause the electronic imaging unit 1B, in stead of the focus lens of the lens unit 1A, to move along the optical axis to adjust a focusing position of the lens unit 1A.

The imaging control unit 2 can also perform a control to adjust a condition of imaging a specific object, such as Auto Focus (AF) processing, Auto Exposure (AE) processing, and Auto White Balance (AWB) processing.

The image data generating unit 3 arbitrary performs gain adjustment for each color component of RGB of an signal of the frame image, which signal has an analog value and is transferred from the electronic imaging unit 1B, and after that, causes a sample/hold circuit (not illustrated) to sample and hold the signal, causes an A/D converter (not illustrated) to convert the signal into digital data, causes a color process circuit (not illustrated) to perform colorization processing including pixel interpolation processing and gamma correction processing, and then generates a luminance signal Y and color difference signals Cb, Cr (YUV data) which have digital values.

The luminance signal Y and color difference signals Cb, Cr output from the color process circuit are subjected to DMA transfer to the memory 4, which is used as a buffer memory, through a DMA controller not illustrated.

The memory 4 is composed of, for example, a Dynamic Random Access Memory (DRAM) or the like, and temporarily stores data and the like to be processed by each unit such as the image processing unit 7 and the central control unit 11 of a main body of the imaging apparatus 100.

The recording medium control unit 5 is configured so that a recording medium M is attachable/detachable thereto/therefrom, and controls writing/reading of data in/from the recording medium M attached to the recording medium control unit 5.

Concretely, the recording medium control unit 5 reads out image data of a still image and/or image data of a moving image composed of a plurality of image frames from the recording medium M, which data are encoded according to a predetermined encoding scheme such as a Joint Photographics Experts Group (JPEG) format, motion JPEG format, and Motion Pictures Experts Group (MPEG) format, and transfers the encoded image data to the image processing unit 7. To the image data, various pieces of information, for example, a focal point distance, an object distance between the main body of the imaging apparatus 100 and a specific object, an imaging location of the image detected by a location detection unit (not illustrated), an imaging time, etc. can be attached, as Exchangeable image file format (Exif) information.

Incidentally, the recording medium M is composed of a nonvolatile memory (flash memory) or the like, for example. This configuration is a mere example and can be arbitrary changed.

Figure 6A:
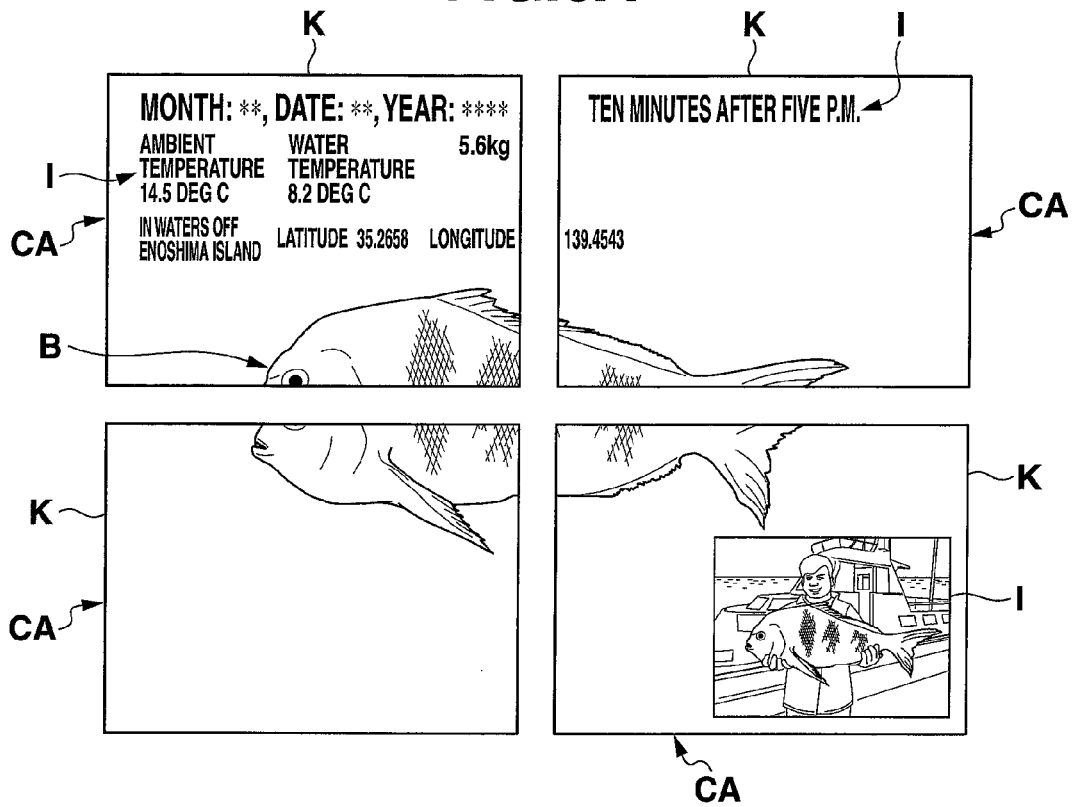
FIG. 6A is a diagram illustrating a diagram schematically illustrating an example of images relevant to the file generating processing illustrated in FIG. 2.
Figure 6B:
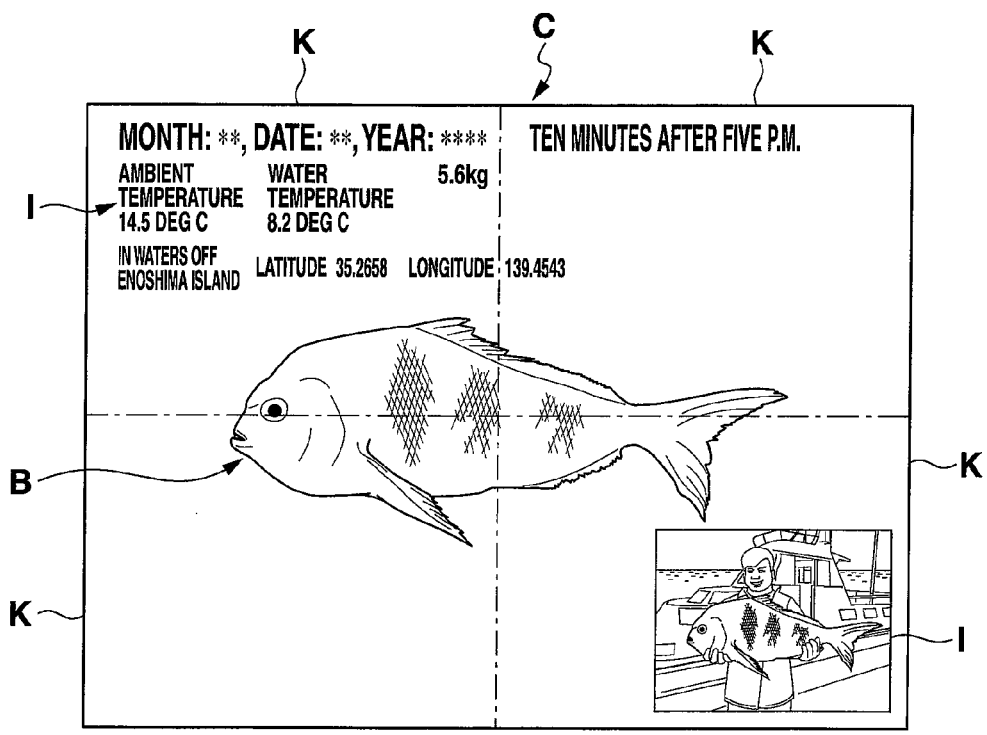
FIG. 6B is a diagram illustrating a diagram schematically illustrating an example of an image relevant to the file generating processing illustrated in FIG. 2.

The print condition setting unit 6 sets a print condition of printing an object image B (see FIG. 6B) on a print medium K.

Concretely, the print condition setting unit 6 sets, as the print condition, at least one of a size of the print medium K and a print resolution. For example, the print condition setting unit 6 sets the size (for example, a postcard size, A4 size, B5 size, etc.) of the print medium K specified on the basis of a predetermined operation in the operation input unit 10 by a user, and/or a resolution (dpi) of printing by a printing device 200 (see FIG. 1) as the printing condition. The set printing conditions are recorded in a predetermined storage section (for example, the memory 4).

Incidentally, the printing condition can be previously set as a default condition. As the print medium K, paper, a film, etc. can be used, but it is a mere example. The print medium K is not limited to the above and can be arbitrary changed.

The image processing unit 7 includes an image obtaining unit 7A, an object extracting unit 7B, a first print size specifying unit 7C, a print content determining unit 7D, a first file generating unit 7E, and a file correlating unit 7F.

Each unit of the image processing unit 7 is composed of a predetermined logic circuit, but it is a mere example and the present invention is not limited thereto.

The image obtaining unit 7A obtains print target data which is to be printed.

Figure 5A:
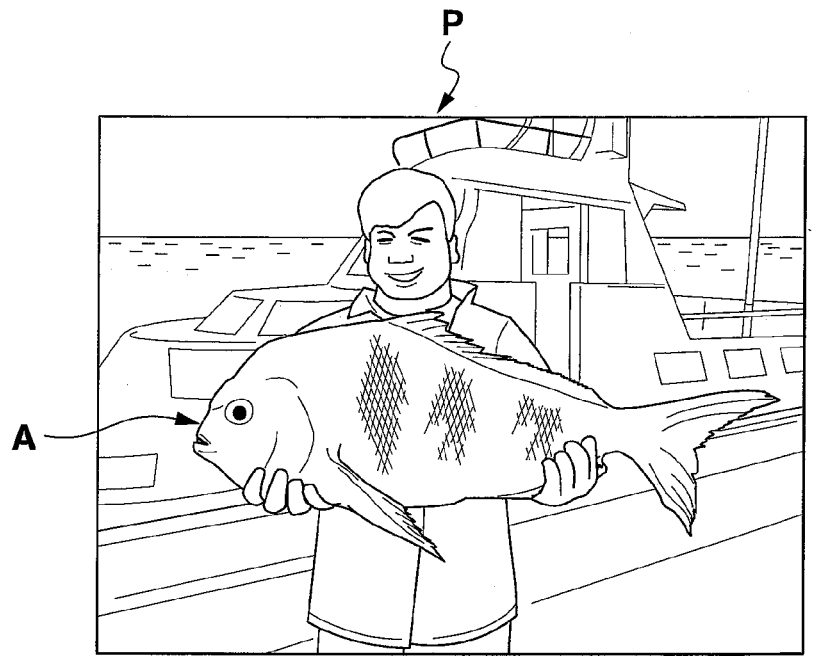
FIG. 5A is a diagram schematically illustrating an example of an image relevant to the file generating processing illustrated in FIG. 2.
Figure 5B:
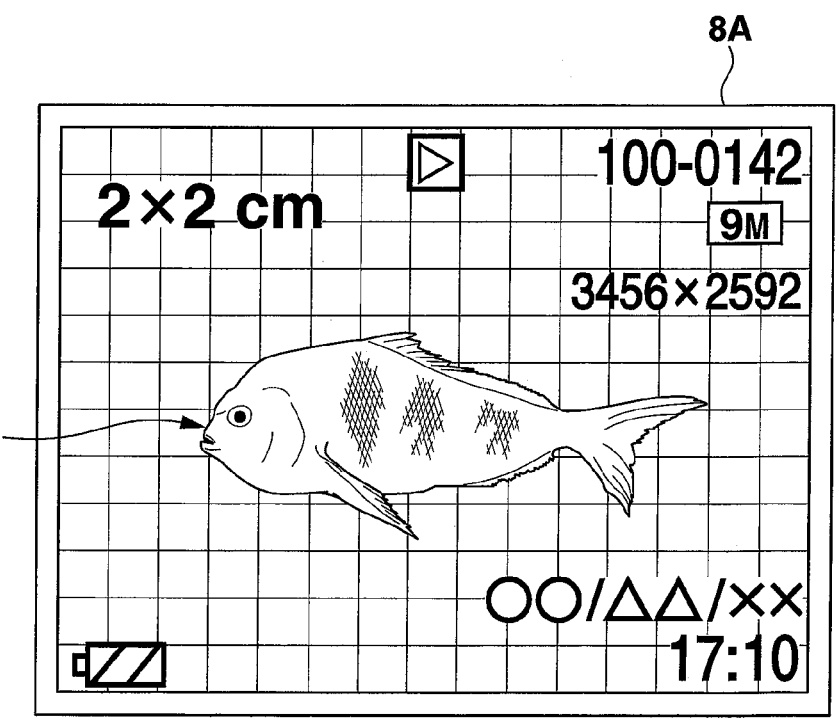
FIG. 5B is a diagram illustrating a diagram schematically illustrating an example of an image relevant to the file generating processing illustrated in FIG. 2.

Concretely, the image obtaining unit (obtaining section) 7A obtains image data (print target data) of one(1) image (for example, an imaged image P; see FIG. 5A) including a specific object, which has been imaged by the imaging unit 1. More specifically, the image obtaining unit 7A obtains from the memory 4 a copy of image data (RGB data and/or YUV data) of the imaged image P generated by the image data generating unit 3 by imaging the specific object by the imaging unit 1 and the imaging control unit 2, and/or obtains a copy of image data of a recorded image which is recorded in the recording medium M.

Incidentally, each process to be executed by the later-described image processing unit 7 can be performed with respect to image data of one(1) image itself, or can be performed, as appropriate, with respect to reduced image data having a predetermined size (for example, VGA size etc.) obtained by reducing the image data of one(1) image at a predetermined ratio.

The object extracting unit 7B extracts a specific object portion from the image.

Concretely, the object extracting unit (extracting section) 7B performs extracting processing to extract the specific object portion from the one(1) image (for example, the imaged image P, etc.) obtained by the image obtaining unit 7A. More specifically, when an object region A (for example, a portion of a fish; see FIG. 5A) is specified on the basis of a predetermined operation in the operation input unit 10 by a user, the object extracting unit 7B performs processing to cut out the object region A from the one(1) image. At that time, the object extracting unit 7B can execute a correction by deleting an unnecessary region (for example, a portion of hands holding the fish in FIG. 5A) from the object region A extracted from the one(1) image, by replacing the unnecessary region with a similar region. Because the processing to delete the unnecessary region is known technique, the detailed description thereof is omitted here.

Although the object region A is specified on the basis of a predetermined operation in the operation input unit 10 by a user, it is a mere example of the method for specifying the object region A. The present invention is not limited to the above and can be arbitrary changed. For example, the object extracting unit 7B can calculate a contrast, resolution (for example, an amount of high frequency component), etc. of the one(1) image to automatically extract a region which is visually in focus as the object region A.

It is also possible to perform a predetermined art conversion processing to the object region A extracted by the object extracting unit 7B so that the image is processed to have various visual effects. Here, the art conversion processing refers to image processing to change a visual effect of the object image B which corresponds to the object region A and is to be processed, namely, an appearance of the object image B in the state of being displayed in the display unit 8, and/or an appearance of the object image B in the stage of being printed on the print medium K. The art conversion processing includes, for example, processing by which the image has a visual effect as if a fish print has been made by using Indian ink.

Incidentally, a technique to process the image, which is of the processing object, so as to have various visual effects is implemented, for example, by processing approximately similar to processing using known software relevant to image processing, and the technique is executed by changing hue, chroma, and brightness in an HSV color space and/or by using various filters. Because these techniques have been known, the detailed descriptions thereof are omitted here.

The first print size specifying unit (specifying section) 7C specifies a print size for printing the specific object portion contained in the image data obtained from the image obtaining unit 7A on the print medium K. Specifically, the first print size specifying unit 7C includes an actual size specifying unit C1 which specifies an actual size of the specific object.

The actual size specifying unit (actual size specifying section) c1 specifies an actual size (real size) of the specific object imaged by the imaging unit 1. The actual size of the specific object includes an actual length of the specific object in at least one(1) direction in an actual world, for example, a length of the specific object in an optical axis orthogonal direction which is orthogonal to the optical axis. Here, the optical axis orthogonal direction corresponds to a direction parallel to a vertical direction or a horizontal direction of an array of a plurality of pixels constituting the imaging element.

Specifically, the actual size specifying unit C1 specifies the actual size of the specific object, on the basis of a distance (an object distance between the main body of the imaging apparatus 100 and the specific object) from the main body to the specific object at the time of imaging by the imaging apparatus 100, and on the basis of a size of the object region A in the one(1) image (for example, the imaged image P, etc.) obtained by the image obtaining unit 7A. For example, the actual size specifying unit C1 calculates the object distance, on the basis of the position of the focus lens in the optical axis direction in the state of focusing on the specific object imaged by the imaging unit 1, by a predetermined converting section (for example, a conversion program, conversion table, etc.) The actual size specifying unit C1 also calculates the number (size) of constituent pixels of the object region A, in each of two optical axis orthogonal directions, in the one(1) image which has been imaged from a predetermined focal point distance. The actual size specifying unit C1 then performs a predetermined calculation on the basis of the object distance, the number of constituent pixels in the object region A, and the focal point distance, and thereby specifies the respective lengths (lengths corresponding to a height and a width of the specific object) of the specific object in the two optical axis orthogonal directions, as the actual sizes.

At that time, the actual size specifying unit C1 can specify the actual size of the specific object by utilizing an angle of view at the time of imaging by the imaging unit 1. For example, the actual size specifying unit C1 calculates the angle of view, on the basis of the focal point distance of the lens unit at the time of imaging the specific object by the imaging unit 1, with a predetermined converting section (for example, a conversion program, conversion table, etc.) The actual size specifying unit C1 also performs a predetermined calculation (by utilizing a trigonometric function, for example) on the basis of the calculated angle of view and the object distance, and thereby calculates actual lengths, in the two optical axis orthogonal directions, of the one(1) image imaged from the object distance. The actual size specifying unit C1 then performs a predetermined calculation (by utilizing a proportional relation, for example), on the basis of the actual lengths of the one(1) image in the optical axis orthogonal directions, and on the basis of a ratio of the number of constituent pixels of the object region A occupying a part of the one(1) image to the number of pixels of the one(1) image, in each of the two optical axis orthogonal directions, and thereby specifies the actual size of the specific object.

The print content determining unit 7D determines a print content for printing the object image B.

Concretely, the print content determining unit 7D determines the print content for printing the specific object portion contained in the image data of the one(1) image obtained by the image obtaining unit 7A, in the print size specified by the first print size specifying unit 7C, on the print medium K. More specifically, the print content determining unit 7D determines the print content for printing the object image B corresponding to the object region A, in the actual size of the specific object specified by the actual size specifying unit C1, on the print medium K.

Here, the print content determining unit 7D determines a magnification/reduction ratio of the object region A for printing the object image B in the actual size of the specific object on the print medium K. For example, the print content determining unit 7D determines, as the print content, a pixel pitch of the pixels constituting the object image B (the specific object portion) at the time of printing the object image B in the actual size on the print medium K, on the basis of the actual size of the specific object specified by the actual size specifying unit C1. At that time, the print content determining unit 7D can determine, in addition to the actual size of the specific object, the pixel pitch of the pixels constituting the object image B at the time of printing the object image B in the actual size, on the basis of the number of all pixels constituting the image data of the one(1) image (for example, the imaged image P, etc.) obtained by the image obtaining unit 7A, and the ratio of the number of constituent pixels of the object region A occupying a part of the one(1) image to the number of pixels of the one(1) image, in each of predetermined directions (for example, the optical axis orthogonal directions).

The print content determining unit 7D can also determine the pixel pitch by interpolating a pixel(s) constituting the object image B by a predetermined pixel interpolation processing. Because the pixel interpolation processing is a known technique, the detailed description thereof is omitted here.

The first file generating unit 7E generates an image file of a print image C (see FIG. 6B) for printing the object image B in the print size specified by the first print size specifying unit 7C on at least one(1) print medium K having a predetermined size.

Concretely, the first file generating unit (generating section) 7E generates the image file of the print image C for printing the object image B in the actual size (real scale) of the specific object specified by the actual size specifying unit C1 on at least one(1) print medium K having a predetermined size, on the basis of the print content determined by the print content determining unit 7D. More specifically, the first file generating unit 7E generates the image file of the print image C for printing the object image B corresponding to the object region A in the actual size of the specific object on the print medium K, according to the print condition such as the size of the print medium K set by the print condition setting unit 6 and print resolution, and according to the print content including the pixel pitch of the pixels constituting the object image B determined by the print content determining unit 7D.

The first file generating unit 7E can also generate the image file including related information I (see FIG. 6A, etc.) which is relevant to the specific object. Concretely, the first file generating unit 7E generates the image file which includes, for example, the one(1) image as another image, which is relevant to the specific object and from which the object region A is extracted, an imaging location, imaging time, imaging circumstances (for example, temperature, humidity, etc.) of the one(1) image, and so on, as the related information I.

At that time, the first file generating unit 7E can generate the image file in which the size of the related information is changed, on the basis of the actual size of the specific object specified by the actual size specifying unit C1. For example, the first file generating unit 7E generates the image file in which the size of the related information I is changed, on the basis of the magnification/reduction ratio of the object region A, at the approximately same ratio as the magnification/reduction ratio concerned. Alternatively, the first file generating unit 7E can generate the image file in which the size of the one(1) image is reduced at the reduction ratio desired by a user, from which image the object image A is extracted.

Incidentally, the image file can contain information indicating a position coordinate (for example, a lower right portion, etc.) in the print image C, at which the related information I is combined. The position at which the related information I is combined can be set on the basis of a predetermined operation in the operation input unit 10 by a user, or can be set as a default condition.

The related information I is specified, for example, at the time of imaging the one(1) image, and is temporarily stored in a predetermined storage section (for example, the memory 4, etc.)

Moreover, the first file generating unit 7E judges whether or not the object image B to be printed in the accrual size fits within one(1) print medium K having a predetermined size. When it is judged that the object image B does not fit within one(1) print medium K, the first file generating unit 7E can divide the object image B into a plurality (for example, four) of files so that a plurality of image files are generated (see FIG. 6A).

Here, each of the image files includes an image data of a divided image CA which is obtained by dividing the print image C (the object image B) into a plurality of parts at a predetermined ratio (for example, equal division, etc.) Thus, each of the image files is constituted to correspond to the image data of any one of the divided images CA, . . . .

Incidentally, the size of each print media K, on which each of the divided images CA, . . . corresponding to each of the image files is printed, can be same as one another, or can be different from one another.

The image data of each divided image CA can include an overlap width portion (not illustrated) corresponding to a division position at which the print image C has been divided. Each of the divided images CA, . . . is printed on one(1) print medium K and the divided images CA, . . . are finally combined with one another to constitute the object image B (print image C). For this reason, by providing the image data of each divided image CA with the overlap width portion corresponding to the division position, combining of the divided images CA, . . . after printing can be easily performed. For example, in the case of generating the image files by dividing the object image B into quarters, the overlap width portions each having a predetermined size can be provided at the side of the upper left divided image CA, which side is adjacent to the upper right divided image CA, and at the side of the lower right divided image CA, which side is adjacent to the lower left divided image CA. Concretely, for example, the first file generating unit 7E generates the divided images CA, . . . so that they have different sizes from one another, and then generates the image file in which the overlap width portion is provided in an end portion of the divided image CA having a relatively small size. Alternatively, the first file generating unit 7E sets the sizes of the print media K on which the divided image CA are printed to be different from one another, and then generates the image file in which the overlap width portion is provided in an end portion of the divided image CA to be printed on the relatively large print medium K.

Incidentally, in the case that the image file includes the related information I relevant to the specific object, the first file generating unit 7E can divide also the related information I similarly to the above to make the divided related information I included in each of the image files.

The file correlating unit 7F correlates the plurality of image files to one another.

Concretely, the file correlating unit (correlating section) 7F correlates the image files generated by the first file generating unit 7E. More specifically, the file correlating unit 7F generates one(1) folder (not illustrated) having a predetermined name in which the image files are stored while being correlated to one another. The generated one(1) folder is stored in a predetermined storage region (for example. recording medium M, etc.)

Incidentally, the method for correlating the image files to one another is a mere example. The present invention is not limited thereto, and can arbitrary be changed.

The display unit 8 includes a display panel 8A and a display control unit 8B.

The display panel 8A displays an image within a display screen. As the display panel 8A, for example, a liquid crystal display panel, an organic EL display panel, etc. can be adopted. These are mere examples and the present invention is not limited thereto.

The display control unit 8B performs a control to read out the image data which is temporarily stored in the memory 4 and to be displayed, and to cause the display screen of the display panel 8A to display a predetermined image on the basis of the image data which has been decoded by the image processing unit 7 and has a predetermined size. The display control unit 8B is specifically equipped with a Video Random Access Memory (VRAM), a VRAM controller, a digital video encoder, etc., which are not illustrated. The digital video encoder reads out the luminance signal Y and color difference signals Cb, Cr, which has been decoded by the image processing unit 7 and stored in the VRAM, at a predetermined play frame rate (for example, 30 fps) from the VRAM through the VRAM controller, and generates a video signal from these pieces of data to output the same to the display panel 8.

For example, the display control unit 8B causes the display screen of the display panel 8A to display a live view image, while continually updating the plurality of frame images generated by imaging the specific object by the imaging unit 1 and the imaging control unit 2 at a predetermined frame rate, in the still image imaging mode and/or the moving image imaging mode. The display control unit 8B also causes the display screen of the display panel 8A to display an image (rec view image) which is to be recorded as the still image and/or an image which is being recorded as the moving image.

The display control unit (display control section) 8B causes the display panel 8A to display the object image B and a grid having a predetermined basic size so that the object image B is superimposed on the grid. Specifically, the display control unit 8B sets the basic size (for example, 2×2 centimeters), which is of a size of each square of the grid, on the basis of the actual size of the specific object specified by the actual size specifying unit C1, so that the object image B corresponding to the object region A (for example, fish, etc.) displayed on the display panel 8A schematically represents the actual size thereof. The display control unit 8B then causes the display panel 8A to display the set squares of the grid as a background image, and to schematically display the object image B so as to represent the actual size thereof and superimposed on the grid.

The external device connecting unit 9 is equipped with a terminal (for example, USB terminal, etc.) for connection with an external device (for example, the printing device 200, etc.), and performs transmission/reception of data through a predetermined communication cable (for example, USB cable, etc.; not illustrated).

Specifically, the external device connecting unit 9 transmits the image file generated by the main body of the imaging apparatus 100 to the printing device 200, which is connected to the external device connecting unit 9, for example, via the predetermined communication cable. When receiving the image file transmitted from the imaging apparatus 100, the printing device 200 prints the print image C (object image B) in the actual size of the specific object, on the basis of the image file, on the print medium K having a predetermined size.

Incidentally, the external device connecting unit 9 can be configured to be connected to the external device such as the printing device 200 via a predetermined wireless communication line so that information communication can be performed therebetween.

As the printing device 200, for example, a known device conforming to a standard such as PictBridge can be adopted. Here, the detailed description thereof is omitted.

The operation input unit 10 receives an input for performing a predetermined operation of the imaging apparatus 100. Specifically, the operation input unit 10 is equipped with operation units such as a shutter button for instruction as to imaging of the object, a selection determination button for instruction as to selection of an imaging mode, function, etc., a zoom button for instruction as to adjustment of an amount of zoom, which are not illustrated, and outputs a predetermined operation signal to the central control unit 11 correspondingly to an operation of each button of the operation units.

The central control unit 11 controls the respective units of the imaging apparatus 100. Specifically, the central control unit 11 is equipped with a Central Processing Unit (CPU), etc., though an illustration is omitted, and performs various control operations according to various processing programs (not illustrated) for the imaging apparatus 100.

<File Generating Processing>

Next, file generating processing by the imaging apparatus 100 of the first embodiment will be described with reference to FIGS. 2 to 6.

Figure 2:
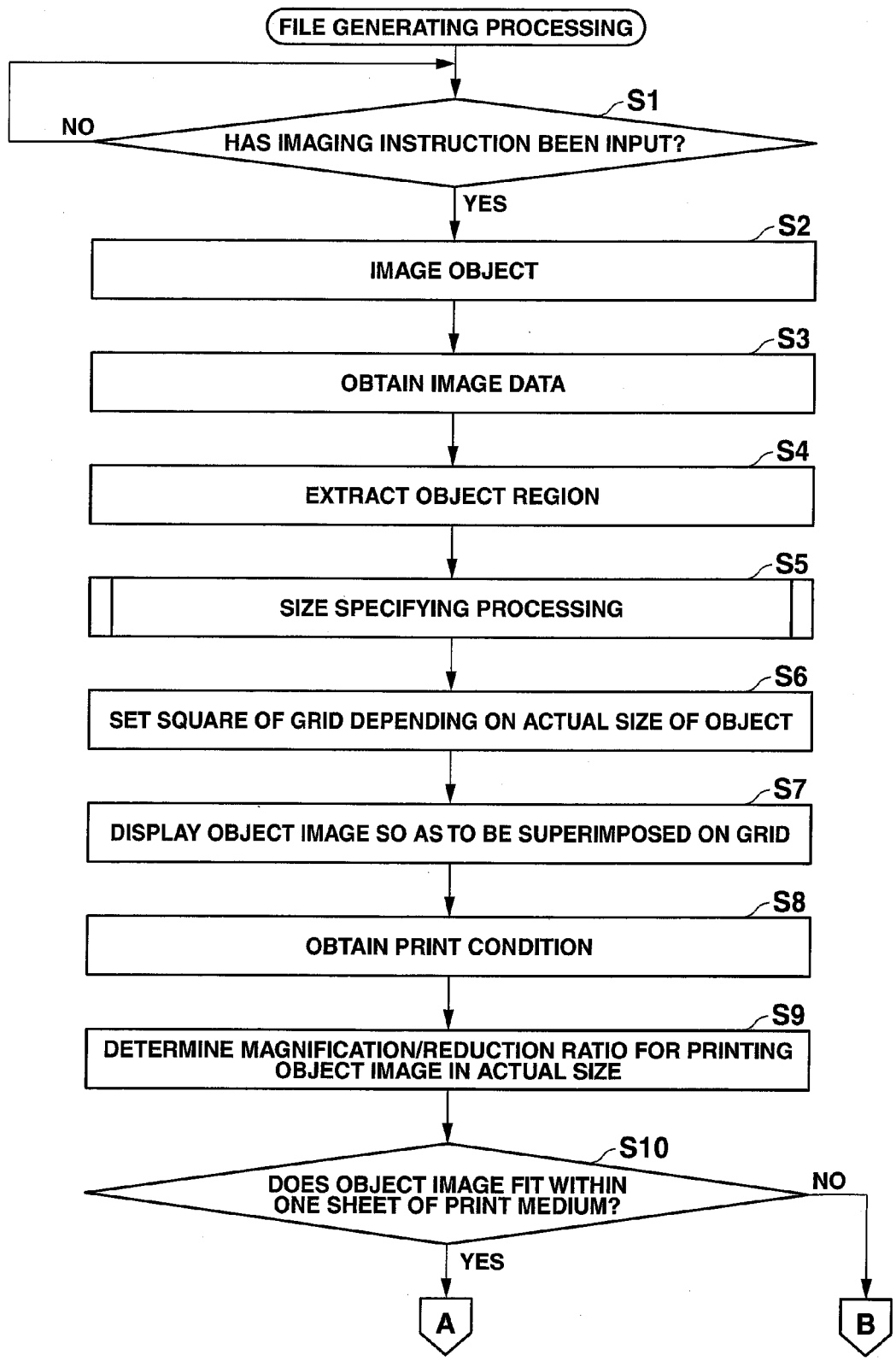
FIG. 2 is a flowchart illustrating an example of an operation relevant to file generating processing by the imaging apparatus illustrated in FIG. 1.
Figure 3:
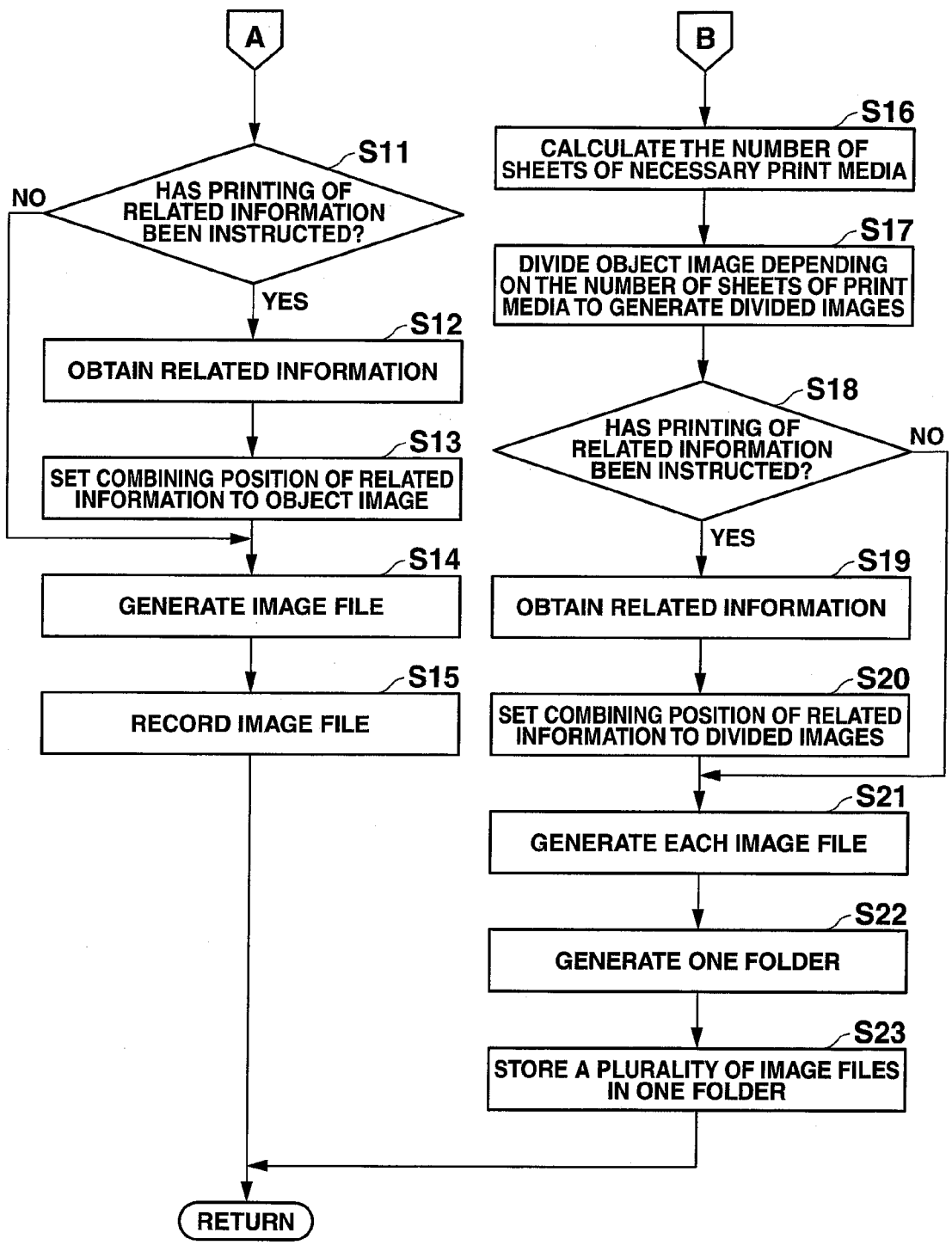
FIG. 3 is a flowchart illustrating processing subsequent to the file generating processing illustrated in FIG. 2.

FIGS. 2 and 3 are flowcharts each illustrating an example of an operation of the file generating processing by the imaging apparatus 100.

The file generating processing is processing to be performed by each unit of the imaging apparatus 100 under the control of the central control unit 11, when a file generating mode has been selected/instructed among a plurality of modes displayed on a menu screen, on the basis of a predetermined operation on the selection determination button of the operation input unit 10 by a user.

In the file generating processing to be described hereinafter, the print condition such as the size of the print medium K and the print resolution is previously set.

As illustrated in FIG. 2, the CPU of the central control unit 11 firstly judges whether or not an imaging instruction has been input on the basis of a predetermined operation on the shutter button of the operation input unit 10 by a user (Step S1). The judgment whether or not the imaging instruction has been input in Step S1 is repeatedly executed at predetermined time intervals until it is judged that the imaging instruction has been input (Step S1; YES).

When it is judged that the imaging instruction has been input (Step S1; YES), the CPU of the central control unit 11 outputs an imaging control command to the imaging control unit 2, and the imaging control unit 2 controls the imaging unit 1 to image the specific object from a predetermined focal point distance (Step S2; see FIG. 5A). Specifically, the imaging control unit 2 causes the imaging unit 1 to image the specific object, and the image data generating unit 3 generates the image data of the imaged image P including the specific object to output the same to the memory 4.

Then, the image obtaining unit 7A of the image processing unit 7 obtains the copy of the image data (RGB data and/or YUV data) of the imaged image P generated by the image data generating unit 3 from the memory 4 (Step S3), and after that, the object extracting unit 7B performs extracting processing to extract the specific object from the imaged image P (Step S4). Specifically, the object extracting unit 7B performs, for example, processing to cut out the object region A (for example, the portion of fish; see FIG. 5A) specified on the basis of a predetermined operation in the operation input unit 10 by a user, from the imaged image P.

Next, the actual size specifying unit C1 perform size specifying processing (see FIG. 4) to specify the actual size of the specific object (Step S5).

Figure 4:
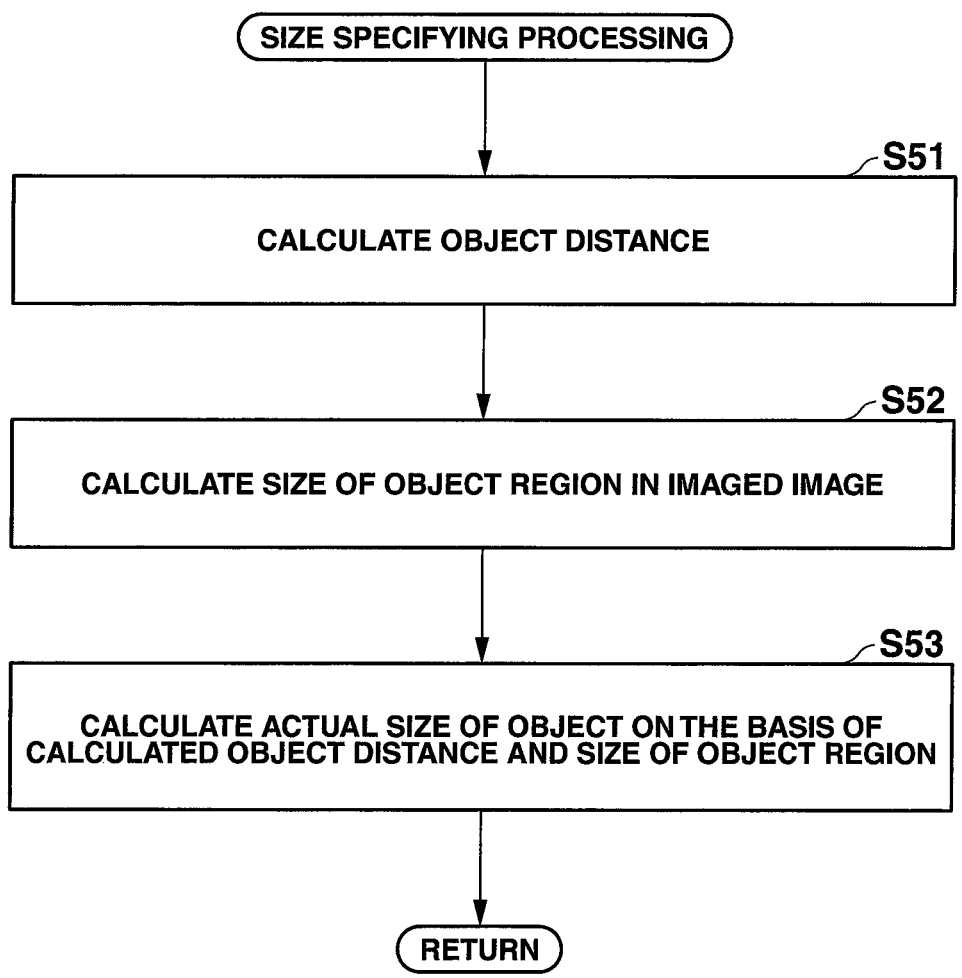
FIG. 4 is a flowchart illustrating an example of an operation relevant to size specifying processing in the file generating processing illustrated in FIG. 2.

Hereinafter, the size specifying processing will be described with reference to FIG. 4. FIG. 4 is a flowchart illustrating an example of an operation of the size specifying processing.

As illustrated in FIG. 4, at first, the actual size specifying unit C1 calculates a distance (object distance) from the main body to the specific object, on the basis of the position of the focus lens in the optical axis direction in the state of focusing on the specific object, by a predetermined converting section (for example, a conversion program, conversion table, etc.) (Step S51).

Then, the actual size specifying unit C1 calculates, as the size, the number of constituent pixels arranged in each of the two optical axis orthogonal directions (namely, the directions corresponding to the height and width of the specific object) in the object region A of the imaged image P which has been imaged from a predetermined focal point distance (Step S52).

Next, the actual size specifying unit C1 performs a predetermined calculation on the basis of the calculated object distance and the calculated number of the constituent pixels, namely the size, of the object region A, to calculate the lengths of the specific object in the two optical axis orthogonal directions as the actual size (Step S53).

Then the size specifying processing is terminated.

Returning to FIG. 2, the display control unit 8B sets the basic size (for example, 2×2 centimeters), which is of the size of each square of the grid, on the basis of the actual size of the specific object calculated by the actual size specifying unit C1 (Step S6). Then, the display control unit 8B causes the display panel 8A to display the squares of the grid set to the basic size, as a background image, and to schematically display the object image B so as to represent the actual size thereof and superimposed on the grid (Step S7; see FIG. 5B).

Next, the print content determining unit 7D obtains the print condition such as the size of the print medium K and the print resolution previously set by the print condition setting unit 6 from a predetermined storage section (for example, the memory 4, etc.) (Step S8), and determines the magnification/reduction ratio of the object region A for printing the object image B in the actual size of the specific object on the print medium K according to the print condition (Step S9). Specifically, for example, the print content determining unit 7D determines the pixel pitch of the object image B for printing it in the actual size thereof on the print medium K, on the basis of the number of all pixels of the image data of the imaged image P, a ratio of the number of constituent pixels of the object region A occupying a part of the imaged image P to the number of pixels of the imaged image P in each of predetermined directions, and the actual size of the specific object.

The first file generating unit 7E then judges whether or not the object image B to be printed in the actual size thereof fits within one(1) sheet of the print medium K having a predetermined size of the print condition (Step S10). Specifically, when printing the object image B in a predetermined orientation with respect to the print medium K, the first file generating unit 7E judges whether or not the object image B fits within the one(1) sheet of the print medium K, depending on whether or not the lengths of the object image B in the two optical axis orthogonal directions are respectively shorter than lengths of the print medium K in the corresponding directions.

When it is judged that the object image B fits within the one(1) sheet of the print medium K (Step S10; YES), as illustrated in FIG. 3, the first file generating unit 7E judges whether or not printing of the related information I relevant to the specific object has been instructed (Step S11).

When it is judged that printing of the related information I has been instructed in Step S11 (Step S11; YES), the first file generating unit 7E obtains the imaged image P itself, from which the object region A is extracted, and an imaging location, imaging time, etc. of the imaged image P, as the related information I, from a predetermined storage section (for example, the memory 4, etc.) (Step S12).

Next, the first file generating unit 7E sets the combining positions of the various pieces of related information I (for example, the imaged image P itself, the imaging location, etc.) with respect to the object image B, for example, on the basis of a predetermined operation in the operation input unit 10 by a user (Step S13), and after that, generates the image file of the print image C including the image data of the object image B, the related information I and information indicating the combining position(s) of the related information I, the print resolution, the pixel pitch of the object image B determined by the print content determining unit 7D (Step S14).

Then, the first file generating unit 7E outputs the generated image file of the print image C to the recording medium control unit 5, and the recording medium control unit 5 causes the image file to be recorded in a predetermined storage region of the recording medium M (Step S15).

On the other hand, when it is judged that printing of the related information I has not been instructed in Step S11 (Step S11; NO), the first file generating unit 7E makes the processing shift to Step S14, and generates the image file of the print image C including the image data of the object image B, the print resolution, the pixel pitch of the object image B determined by the print content determining unit 7D, and so on (Step S14). Then, the recording medium control unit 5 causes the image file of the print image C output from the first file generating unit 7E to be recorded in a predetermined storage region of the recording medium M (Step S15).

When it is judged that the object image B does not fit within the one(1) sheet of the print medium K in Step S10 (Step S10; NO), as illustrated in FIG. 3, the first file generating unit 7E calculates the number of sheets (for example, four sheets) of the print media K necessary for printing the object image B in the actual size (Step S16; see FIG. 6A). Specifically, the first file generating unit 7E calculates the number of sheets (for example, the minimum number of sheets required) of the print media K necessary for making the object image B of actual size fit within the print media K, for example, on the basis of the size of the print medium K defined in the print condition and/or the actual size (for example, the pixel pitch of the object image B for printing it in the actual size thereof, the number of pixels, existence or non existence of the overlap width portion, existence or non existence of the related information I, etc.) of the object image B.

Next, the first file generating unit 7E divides the object image B at a predetermined ratio (for example, approximately equal division, etc.) depending on the calculated number of the print media K to generate the divided images CA, . . . (Step S17; see FIG. 6A).

Incidentally, the number of sheets of the print media K does always not need to be same as the number of divisions of the object image B. For example, it is possible to use the print media K whose number of sheets is larger than the number of the divisions of the object image B depending on the combining position (described later) of the related information I with respect to the object image B.

The first file generating unit 7E is then judges whether or not printing of the related information I has been instructed, substantively similarly to processing of Step S11 (Step S18).

When it is judged that printing of the related information I has been instructed (Step S18; YES), the first file generating unit 7E obtains the related information I from a predetermined storage section (for example, the memory 4, etc.), substantively similarly to processing of Step S12 (Step S19).

Subsequently, the first file generating unit 7E sets the combining positions of the various pieces of related information I (for example, the imaged image P itself, the imaging location, etc.) with respect to the divided images CA, . . . (Step S20). Specifically, for example, specifying of the combining positions of the related information I is performed with respect to the object image B before dividing it into the divided images CA, . . . , on the basis of a predetermined operation in the operation input unit 10 by a user. The first file generating unit 7E then divides the related information I combined at the specified combining positions depending on the dividing positions of the object image B, similarly to dividing of the object image B, and correlates the divided related information I to the divided images CA, . . . .

Next, the first file generating unit 7E generates, for each divided image CA, the image file which includes the image data of the divided image CA, positional information of the divided image CA with respect to the object image B, the related information I and information indicating the combining position of the related information I, the print resolution, and the pixel pitch of the object image B determined by the print content determining unit 7D. After that, the first file generating unit 7E outputs the generated image file of each divided image C to the recording medium control unit 5.

Subsequently, the file correlating unit 7F generates the one(1) folder having a predetermined name for storing the plurality of image files generated by the first file generating unit 7E while correlating them to one another (Step S22). After that, the file correlating unit 7F outputs the generated one(1) folder to the recording medium control unit 5.

Then, the recording medium control unit 5 stores the image files of the divided images CA, . . . so as to be correlated to one another in the one(1) folder, and causes the folder to be recorded in a predetermined storage region of the recording medium M (Step S23).

On the other hand, when it is judged that printing of the related information I has not been instructed in Step S18 (Step S18; NO), the first file generating unit 7E shifts the processing to Step S21, and generates, for each divided image CA, the image file including the image data of the divided image CA, the positional information of the divided image CA with respect to the object image B, the print resolution, and the pixel pitch of the object image B determined by the print content determining unit 7D, and so on (Step S21).

The file correlating unit 7F generates one(1) folder having a predetermined name for storing the image files while correlating them to one another (Step S22), and then the recording medium control unit 5 stores the image files of the divided images CA, . . . so as to be correlated to one another in the one(1) folder, and causes the folder to be recorded in a predetermined storage region of the recording medium M (Step S23).

After that, by transmitting the image files to the printing device 200 connected to the imaging apparatus 1 through the external device connecting unit 9, the printing device 200 prints the print image C and/or the divided images CA, . . . in the actual size of the specific object on the print medium K having the predetermined size, on the basis of the received image files.

As described above, because the imaging apparatus 100 of the first embodiment determines the print content for printing the specific object portion (object region A) contained in the image data of one(1) image (for example, the imaged image P) including the specific object in the specified actual size of the specific object on the print medium K, it becomes unnecessary to take an image of a tool (for example, ruler, etc.) indicating a reference length together with the specific object for printing the real scale image (object image B) of the specific object, and the real scale image of the specific object can be printed without performing special processing such as magnification/reduction processing of the object region A.

Moreover, because the imaging apparatus 100 generates the image file for printing the object image B in the specified actual size of the specific object on at least one(1) print medium K having a predetermined size, the real scale image (see FIG. 6B) of the specific object can be easily printed in the printing device 200 by utilizing the generated image file. Specifically, by using at least one of the size of the print medium K and the print resolution as the print condition, the image file for printing the object image B in the actual size of the specific object on the print medium K can be generated according to the print condition.

Furthermore, because the imaging apparatus 100 determines the pixel pitch of pixels constituting the object image B for printing the object image B in the actual size on the print medium K, the magnification/reduction ratio of the object region A for printing the object image B in the actual size of the specific object on the print medium K can be determined, and the printing device 200 can print the real scale image of the specific object more precisely. At that time, by determining the pixel pitch of the pixels constituting the object image B on the basis of the number of all pixels constituting the image data of the one(1) image (for example, the imaged image P, etc.) and the ratio of the specific object occupying a part of the one(1) image in addition to the actual size of the specific object, the magnification/reduction ratio of the object region A for printing the object image B in the actual size of the specific object on the print medium K can be determined more precisely.

Moreover, because the plurality of image files are generated by division when the object image B does not fit within the one(1) print medium K having a predetermined size, it is possible to use these image files to combine the divided images CA, . . . printed in the printing device 200 with one another so that the real scale image of the specific object is obtained. Especially, by allowing each piece of image data of the divided images CA, . . . , obtained by dividing the object image B into plural portions, to have the overlap width portion corresponding to the dividing position, bonding of the divided images CA, . . . can be easily performed by using the overlap width portions.

Furthermore, by correlating the divided image files to one another, the image files can be prevented from scattering, and management of the image files can be performed properly.

Additionally, because the image file including the related information I relevant to the specific object is generated, by using the image file, the various pieces of related information I such as another image relevant to the specific object, and the imaging location, imaging time, imaging circumstances of the image can be printed together with the real scale image of the specific object. Especially, by printing the another image relevant to the specific object together with the real scale image of the specific object, a user can recognize, for example, the main object and surrounding circumstances/condition, etc., as if he or she sees a commemorative photo.

Moreover, by generating the image file in which the size of the related information I is changed on the basis of the actual size of the specific object, for example, it is possible to reduce the size of the related information I so as not to overlap with the specific object, and/or to increase the size of the related information I so as to enable a user to easily recognize the information. Thus, the various pieces of related information I can be printed in a mode where a user can easily recognize the related information I and/or the specific object.

Furthermore, because the imaging apparatus 100 specifies the actual size of the specific object on the basis of the distance (object distance) up to the specific object at the time of imaging by the imaging unit 1 and the size of the object region A within the one(1) image, the actual size of the specific object can be properly specified without imaging the tool (for example, ruler, etc.) indicating the reference length together with the specific object. Especially, by using the angle of view at the time of imaging the specific object by the imaging unit 1, the actual size of the specific object can be specified more properly.

Additionally, because the specific object (object image B) extracted from the one(1) image is displayed so as to be superimposed on the grid having a predetermined basic size in the display unit 8, a user can recognize the specified actual size of the specific object.

Incidentally, though the specific object portion (object region A) is extracted from the one(1) image in the first embodiment, this is a mere example and the present invention is not limited thereto. The specific object portion does always not need to be extracted in the main body of the imaging apparatus 100, when only the image of the object region A is previously obtained. Thus, whether or not the imaging apparatus 100 includes the object extracting unit 7B can be arbitrarily changed as appropriate.

Moreover, though the specific object (object image B) and the grid having a predetermined basic size are displayed on the display panel 8A in the first embodiment, this is a mere example and the present invention is not limited thereto. The specific object and the grid having a predetermined basic size do always not need to be displayed. Thus, whether or not the imaging apparatus 100 includes the display control unit 8B can be arbitrarily changed as appropriate.

Furthermore, though the print condition is previously set in the first embodiment, this is a mere example and the present invention is not limited thereto. The print condition does always not need to be previously set. Thus, whether or not the imaging apparatus 100 includes the print condition setting unit 6 can be arbitrarily changed as appropriate.

For example, in the case that the print condition is not set, the image files corresponding to a plurality of expected printing modes can be generated by combining the sizes of the print media K of known standard and the print resolution. In this case, at the time of printing by the printing device 200, one(1) image file of the format printable by the printing device 200 can be automatically selected from among the image files corresponding to the printing modes, or the image file desired by a user can be specified among the image files of printable format.

Moreover, though the specific object is cut out to generate the image file for printing the specific object portion in the actual size in the first embodiment, this is a mere example and the present invention is not limited thereto. For example, the image file having a margin of a predetermined width along an outer rim of the specific object portion can be generated, or the image file for printing the one(1) image itself in actual size as the print target without cutting out the specific object portion, can be generated.

In addition, though the first embodiment describes the configuration where the functions as the obtaining section, the actual size specifying section, and the determining section are implemented by driving the image obtaining unit 7A, the actual size specifying unit C1, and the print content determining unit 7D under the control of the central control unit 11, the present invention is not limited thereto and also the configuration where the above functions are implemented by executing a predetermined program, etc. by the central control unit 11 can be adopted.

Concretely, a program memory (not illustrated) for storing a program previously stores a program including a obtaining processing routine, an actual size specifying processing routine, and a determining processing routine. It is possible to then cause the CPU of the central control unit 11 to function, by the obtaining processing routine, as a section which obtains the image data of the image including the specific object imaged by the imaging section. It is also possible to cause the CPU of the central control unit 11 to function, by the actual size specifying processing routine, as a section which specifies the actual size of the specific object. Moreover, it is possible to cause the CPU of the central control unit 11 to function, by the determining processing routine, as a section which determines the print content for printing the specific object portion contained in the obtained image data in the specified actual size of the specific object on the print medium K.

Second Embodiment

Hereinafter, an imaging apparatus 300 of a second embodiment will be described.

The imaging apparatus 300 of the second embodiment has substantially same configuration as that of the imaging apparatus 100 of the first embodiment except the points to be described later in detail, and the detailed description of the imaging apparatus 300 omitted.

Figure 7:
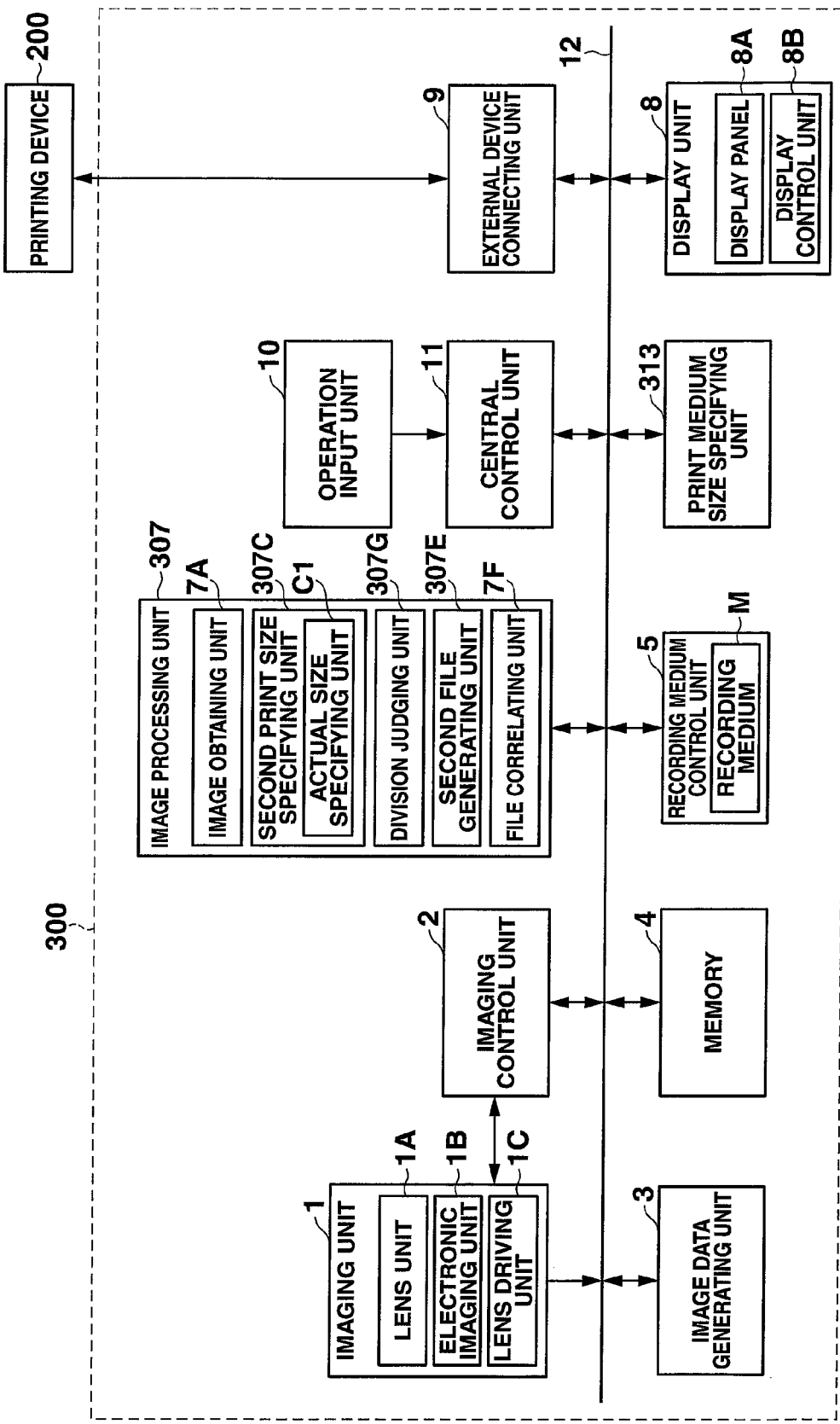
FIG. 7 is a block diagram illustrating a schematic configuration of an imaging apparatus according to a second embodiment to which the present invention is applied.

FIG. 7 is a block diagram illustrating a schematic configuration of the imaging apparatus 300 of the second embodiment to which the present invention is applied.

As illustrated in FIG. 7, the imaging apparatus 300 of the second embodiment includes: an imaging unit 1; an imaging control unit 2; an image data generating unit 3; a memory 4; a recording medium control unit 5; a print medium size specifying unit 313; an image processing unit 307; a display unit 8; an external device connecting unit 9; an operation input unit 10; and a central control unit 11.

Incidentally, the imaging unit 1, imaging control unit 2, image data generating unit 3, memory 4, recording medium control unit 5, display unit 8, external device connecting unit 9, operation input unit 10, and central control unit 11 have substantively same configurations as those of the imaging apparatus 100 of the first embodiment, and the detailed descriptions thereof are omitted here.

The print medium size specifying unit 313 specifies the size of the print medium K on which the print target data is to be printed.

Concretely, the print medium size specifying unit (second specifying section) 313 specifies the size of the print medium K on which the image data (print target data) of one(1) image (for example, one(1) image including the specific object imaged by the imaging unit 1, etc.) to be printed is printed. More specifically, the print medium size specifying unit 313 specifies the size (for example, a post card size, A4 size, B5 size, etc.) of the print medium K assigned on the basis of a predetermined operation in the operation input unit 10 by a user. The specified size of the print medium K is recorded in a predetermined storage section (for example, the memory 4, etc.).

The image processing unit 307 includes an image obtaining unit 7A, a second print size specifying unit 307C, a division judging unit 307G, a second file generating unit 307E, and a file correlating unit 7F.

Incidentally, the image obtaining unit 7A and the file correlating unit 7F have substantively same configuration and function as those of the imaging apparatus 100 of the first embodiment, and the detailed descriptions thereof are omitted here.

The second print size specifying unit (first specifying section) 307C specifies the print size for printing the image data (print target data) obtained by the image obtaining unit 7A on the print medium K.

Concretely, the second print size specifying unit 307C includes the actual size specifying unit C1 to specify the actual size of the specific object, substantially similarly to the first print size specifying unit 7C of the first embodiment. Incidentally, the function of the actual size specifying unit C1 is substantially same as that of, the first embodiment, and the detailed description thereof is omitted here. The second print size specifying unit 307C specifies the print size of the image data for printing the specific object portion contained in the image data obtained by the image obtaining unit 7A in the actual size of the specific object specified by the actual size specifying unit C1 on the print medium K.

The second print size specifying unit 307C specifies the print size on the basis of the information correlated to the image data obtained by the image obtaining unit 7A. Specifically, the second print size specifying unit 307C refers to the Exif information attached to the image data obtained, by the image obtaining unit 7A to specify the print size for printing the object image B contained in the Exif information on the print medium K.

The second print size specifying unit 307C specifies also the print size which has been assigned on the basis of a predetermined operation in the operation input unit 10 by a user. Specifically, when the size desired by a user is assigned as the print size for printing the object image B on the print medium K on the basis of a predetermined operation in the operation unit of the operation input unit 10 by a user, the second print size specifying unit 307C specifies the assigned size desired by a user as the print size.

The division judging unit 307G judges whether or not division into the print media K, . . . is performed when printing the image data (print target data) obtained by the image obtaining unit 7A.

Concretely, the division judging unit (judging section) 307G judges whether or not division into the print media K, . . . is performed when printing the image data obtained by the image obtaining unit 7A on the basis of the print size specified by the second print size specifying unit 307C and the size of the print medium K specified by the print medium size specifying unit 313. More specifically, for example, the division judging unit 307G judges whether or not the image data to be printed in the print size specified by the second print size specifying unit 307C fits within the one(1) print medium K having the size specified by the print medium size specifying unit 313, and when it is judged that the image data does not fit within the one(1) print medium K, judges that the division into the print media K, . . . is to be performed.

The second file generating unit (generating section) 307E generates one(1) or a plurality of image files for printing the image data (print target data) obtained by the image obtaining unit 7A in the printing size specified by the second print size specifying unit 307C on the one(1) or the plurality of print media K, . . . each having the size specified by the print medium size specifying unit 313, on the basis of a judgment result by the division judging unit 307G.

Concretely, the second file generating unit 307E generates one(1) or a plurality of image files for printing the print target data, in the actual size of the specific object specified by the actual size specifying unit C1, in the print size specified on the basis of the information correlated to the image data obtained form the image obtaining unit 7A, or in the print size assigned on the basis of a predetermined operation in the operation input unit 10 by a user, on the one(1) or the plurality of print media K, . . . each having the size specified by the print medium size specifying unit 313.

More specifically, the second file generating unit 307E determines the print content for printing the print target data in the print size specified by the second print size specifying unit 307C, on the print media K, . . . each having the size specified by the print medium size specifying unit 313. For example, the second file generating unit 307E determines, as the print content, the pixel pitch of pixels constituting the print target data at the time of printing the print target data in the print size specified by the second print size specifying unit 307C on the print medium K. At that time, the second file generating unit 307E can determine, as the print content, the pixel pitch of pixels constituting the specified object portion (object image B) at the time of printing the specified object portion in the print size specified by the second print size specifying unit 307C on the print medium K, on the basis of the number of all pixels constituting the image data of the one(1) image (for example, the imaged image P, etc.) obtained by the image obtaining unit 7A and the ratio of the number of constituent pixels of the object region A occupying a part of the one(1) image to the number of pixels of the one(1) image in each of predetermined directions (for example, the optical axis orthogonal directions).

Then, the second file generating unit 307E generates one(1) or plurality of image files of the print image C (see FIG. 6B) according to the determined print content. Specifically, when the division judging unit 307G determines that the image data obtained by the image obtaining unit 7A is divided to be printed on the plurality of print media K, . . . , the second file generating unit 307E divides the image data into the plurality of files so that the plurality of image files of the print image C are generated.

Since the compositions of the image files are the substantively same as those of the first embodiment, the detailed description thereof is omitted here.

Incidentally, the second file generating unit 307E can perform processing substantially same as that of the first file generating unit 7E of the first embodiment to generate the image file including the related information I (for example, the image relevant to the image data, etc.) related to the image data (for example, the specific object, etc.) obtained by the image obtaining unit 7A. At that time, the second file generating unit 307E can perform the processing substantially same as that of the first file generating unit 7E to generate the image file in which the size of the related information I is changed, on the basis of the print size specified by the second print size specifying unit 307C.

<File Generating Processing>

Next, the file generating processing by the imaging apparatus 300 according to the second embodiment will be described with reference to the FIG. 8.

FIG. 8 is a flowchart illustrating an example of the operation relevant to the file generating processing by the imaging apparatus 300.

As illustrated in FIG. 8, first, the recording medium control unit 5 reads out the copy of the image data (RGB data and/or YUV data) of the image assigned on the basis of the predetermined operation in the operation input unit 10 by a user from the recording medium M, and the image obtaining unit 7A of the image processing unit 7 obtains the image data which has been read out (Step S101).

Then, the second print size specifying unit 307C specifies the print size for printing the image data obtained by the image obtaining unit 7A on the print medium K (Step S102). Specifically, the second print size specifying unit 307C specifies the print size for printing the specified object on the print medium K by the method desired by a user. For example, the second print size specifying unit 307C specifies (size specifying processing; see FIG. 4) the actual size of the specific object by the actual size specifying unit C1 to specify the same as the print size, specifies the print size for printing the object image B on the print medium K by referring to the Exif information attached to the image data, or specifies, as the print size, the size desired by a user which has been assigned on the basis of the predetermined operation in the operation input unit 10 by a user.

Since the size specifying processing is substantially same as that of the first embodiment, and the detailed description thereof is omitted.

Next, the print medium size specifying unit 313 specifies the size (for example, B5 size, etc.) of the print medium K assigned on the basis of the predetermined operation in the operation input unit 10 by a user (Step S103).

Subsequently, the division judging unit 307G judges whether or not the image data to be printed in the print size specified by the second print size specifying unit 307C fits within the one(1) print medium K having the size specified by the print medium size specifying unit 313 (Step S104).

When it is judged that the image data fits within the one(1) print medium K in Step S104 (Step S104; YES), the second file generating unit 307E generates one(1) image file of the print image C for printing the image data obtained by the image obtaining unit 7A in the print size specified by the second print size specifying unit 307C on the one(1) print medium K having the size specified by the print medium size specifying unit 313 (Step S105). Specifically, the second file generating unit 307E determines, as the print content, the pixel pitch of pixels constituting the print target data at the time of printing the print target data in the print size specified the second print size specifying unit 307C on the print medium K, and generates the one(1) image file of the print image C according to the determined print content.

Then, the second file generating unit 307E outputs the one(1) generated image file of the print image C to the recording medium control unit 5, and the recording medium control unit 5 causes the recording medium M to store the one(1) image file in the predetermined storage region thereof (Step S106).

On the other hand, when it is judged that the image data does not fit within the one(1) print medium K in Step S104 (Step S104; NO), the second file generating unit 307E calculates the number of sheets (for example, four sheets, etc.) of the print media K, . . . necessary for printing the image data obtained by the image obtaining unit 7A, in the print size specified by the second print size specifying unit 307C, on the print media K, . . . each having the size specified by the print medium size specifying unit 313 (Step S107; see FIG. 6A), and divides the object image B, at the predetermined rate (for example, approximately equal division, etc.) according to the calculated number of print media K, . . . , to generate the divided images CA, . . . (Step S108; see FIG. 6A). Since each process of Steps S107, S108 is substantially same as that of Steps S16, S17 in the file generating processing of the first embodiment, the detailed descriptions thereof is omitted.

Next, the second file generating unit 307E generates the image files of the print image C for printing the image data obtained by the image obtaining unit 7A, in the print size specified by the second print size specifying unit 307C, on the plurality of print media K, . . . each having the size specified by the print medium size specifying unit 313 (Step S109). Specifically, the second file generating unit 307E determines, as the print content, the pixel pitch of pixels constituting the print target data at the time of printing the print target data in the size specified by the second print size specifying unit 307C on the print media K, . . . , and generates the plurality of image files respectively corresponding to the divided images CA, . . . according to the determined print content. After that, the second file generating unit 307E outputs the image files, generated correspondingly to the divided images CA, . . . , to the recording medium control unit 5.

Subsequently, the file correlating unit 7F generates one(1) folder which has the predetermined name and stores the plurality of image files generated by the first file generating unit 307E while correlating them to one another (Step S110). Then, the file correlating unit 7F outputs the one(1) generated folder to the recording medium control unit 5.

Then, the recording medium control unit 5 stores the image files respectively corresponding to the divided images CA, . . . in the one(1) folder, while correlating them to one another, and causes the recording medium M to stores the same in the predetermined storage region thereof (Step S111).

After that, when the above-described image files are transmitted to the printing device 200 which is connected to the imaging apparatus 100 via the external device connecting unit 9, the printing device 200 prints, on the basis of the transmitted image files, the print image C and/or the divided images CA, . . . in the print size specified by the second print size specifying unit 307C on the one(1) or plurality of print media K each having the size specified by the print medium size specifying unit 313.

As described above, since the imaging apparatus 300 according to the second embodiment judges whether or not the image data obtained by the image obtaining unit 7A is divided to be printed on the plurality of print media K, . . . when printing the image data, on the basis of the print size specified by the second print size specifying unit 307C and the sizes of print media K, . . . specified by the print medium size specifying unit 313, it is possible to automatically determine whether or not to divide the image data to be printed on the print media K, . . . without troublesome operations by a user, and processing for dividing the print target data to be printed on the print media K, . . . can be simplified.

Moreover, since the one(1) or plurality of image files are generated for printing the print target data in the print size specified by the second print size specifying unit 307C on the one(1) or plurality of print media K, . . . each having the size specified by the print medium size specifying unit 313, the print target data can be printed, by utilizing the one(1) or plurality of image files, in the print size specified by the second print size specifying unit 307C on the one(1) or plurality of print media K, . . . each having the size specified by the print medium size specifying unit 313, without performing specific processing such as magnification/reduction processing of the image data in the printing device 200.

Specifically, when it is judged that the print target data is divided to be printed on the print media K, . . . , it is possible to automatically divide the image file to generate the plurality of image files. It is also possible to determine the print content for printing the image data on the print media K, . . . each having the size specified by the print medium size specifying unit 313, in the actual size of the specified object specified by the actual size specifying unit C1, or in the print size specified based on the information correlated to the image data obtained by the image obtaining unit 7A, or in the print size assigned based on the predetermined operation in the operation input unit 10 by a user, and to generate the one(1) or plurality of image files according to the determined print content.

Furthermore, since the pixel pitch of pixels constituting the print target data at the time of printing it in the print size specified by the second print size specifying unit 307C on the print media K, . . . is determined as the print content, it is possible to determined the magnification/reduction ratio for printing the print target data in the print size specified by the second print size specifying unit 307C. Especially, since the pixel pitch of pixels constituting the specific object portion at the time of printing it in the print size specified by the second print size specifying unit 307C on the print media K, . . . on the basis of the number of all pixels constituting the print target image and the ratio of the specific object occupying a part of the image, it is possible to determine the magnification/reduction ratio of the specific object portion for printing the specific object portion in the print size specified by the second print size specifying unit 307C.

Incidentally, the present invention is not limited to the first and second embodiments, and various improvements and design changes can be performed without departing from the spirit of the present invention.

For example, though the image files are correlated to one another in the first and second embodiments, it is a mere example and the present invention is not limited thereto. The image files do not always need to be correlated to one another. In other words, whether or not each of the imaging apparatuses 100, 300 is equipped with the file correlating unit 7F can be arbitrarily determined as needed.

Moreover, though the first and second embodiments illustrate the image data of one(1) image as the print target data, it is a mere example and the present invention is not limited thereto. For example, the data, such as text data, except the image data can be adopted.

Furthermore, though the size of the print medium K is specified on the basis of the predetermined operation in the operation input unit 10 by a user in the first and second embodiments, it is a mere example and the preset invention is not limited thereto. The method for specifying the size of the print medium K can be arbitrarily changed as needed.

For example, the imaging apparatuses 100, 300 can obtain the sizes of the print media K, . . . printable by the printing device 200 from the same, and can specify the size desired by a user, which size is assigned among the above sizes of the print media K, . . . on the basis of the predetermined operation in the operation input unit 10 by a user.

Moreover, for example, the imaging apparatuses 100, 300 can perform a predetermined calculation on the basis of the print size at the time of printing the print target data on the print medium K to automatically specify the size of the print medium K with which printing can be performed. For example, in the case that the print size of the print target data is substantively fittable within A3 size, the A3 size is specified as the size of the print medium K, and in the case that the print size of the print target data is substantively fittable within A4 size, the A4 size is specified as the size of the print medium K.

Additionally, in the first and second embodiments, when it is judged that the image data is divided to be printed to the print media K, . . . , the display unit 8 can display a combination (for example, four sheets in the case of A4 size, six sheets in the case of B5 size, etc.) of the type (for example, print sheet) of the print medium K and the number of sheets to inform a user of it.

Although the number of print media K, . . . is calculated by the predetermined calculation in the first and second embodiments, it is a mere example and the present invention is not limited thereto. The method for calculating the number of print media K, . . . can be arbitrary changed as needed. For example, it is possible to previously register a predetermined conversion table, and to refer to the table.

Furthermore, the configurations of the imaging apparatuses (print control apparatuses) 100, 300 illustrated in the first and second embodiments are mere examples, and the present invention is not limited thereto.

In addition, though the functions as the obtaining section, the first specifying section, the second specifying section, and the judging section is implemented by driving the image obtaining unit 7A, the second print size specifying unit 307C, the print medium size specifying unit 313, and the division judging unit 307 under the control of the central control unit 11 in the second embodiment, the present invention is not limited thereto and the configuration where these functions are implemented by executing predetermined programs and the like by the central control unit 11 can be adopted.

Concretely, a program memory (not illustrated) for storing a program previously stores a program including an obtaining processing routine, a first specifying processing routine, a second specifying processing routine, and a judging processing routine. It is possible to cause the CPU of the central control unit 11 to function as a section which obtains the print target data to be subjected to printing, by the obtaining processing routine. It is also possible to cause the CPU of the central control unit 11 to function as a section which specifies the print size at the time of printing the obtained print target data on the print medium K, by the first specifying processing routine. It is also possible to cause the CPU of the central control unit 11 to function as a section which specifies the size of the print medium K on which the print target data is printed, by the second specifying processing routine. It is also possible to cause the CPU of the central control unit 11 to function as a section which judges whether or not the print target data is divided to be printed on the plurality of print media K when performing printing, on the basis of the specified print size and size of the print medium K, by the judging processing routine.

Similarly, also a configuration where the generating section, the actual size specifying section, the correlating section, the extracting section, and display control section are implemented by executing predetermined programs by the CPU of the central control unit 11 can be adopted.

Moreover, as a computer readable medium in which programs for executing the above-described processes are stored, in addition to the ROM, the hard disk, etc., a nonvolatile memory such as a flash memory and a portable recording medium such as a CD-ROM can be adopted. As a medium for providing program data via a predetermined communication line, also carrier wave can be adopted.

The embodiments of the present invention are described above, but the scope of the present invention is not limited to the above-described embodiments and includes the scope of the invention described in the claims and the scope of the equivalents thereof.

While the present invention has been described with reference to the preferred embodiments, it is intended that the invention be not limited by any of the details of the description therein but includes all the embodiments which fall within the scope of the appended claims.

What is claimed is:

1. A print target data processing apparatus comprising:
a file memory, and
a processor,
wherein the processor is configured to perform functions comprising:
obtaining print target data which is to be printed;
specifying a print size for printing the obtained print target data on one or more print media;
specifying a size of the print media on which the print target data is to be printed;
judging whether or not the print target data is divided into the plural print media when being printed, based on the specified print size and the specified size of the print media;
determining a pixel pitch of pixels constituting the print target data at a time of printing the print target data in the specified print size on the print media; and
determining a pixel pitch of pixels constituting a specific object portion at a time of printing the specific object portion in the specified print size on the print media, based on a number of all pixels constituting the print target data and a ratio of the specific object portion to an image.

2. The print target data processing apparatus according to claim 1, further comprising:
an imaging device,
wherein the processor obtains, as the print target data, image data including the specific object portion of an image imaged by the imaging device,
wherein the processor further specifies an actual size of a specific object, and
wherein the processor specifies the print size of the image data for printing the specific object portion included in the obtained image data in the actual size of the specified specific object on the print media.

3. The print target data processing apparatus according to claim 1, wherein the processor specifies the print size based on information correlated to the obtained print target data.

4. The print target data processing apparatus according to claim 1, further comprising:
an input device,
wherein the processor specifies the print size which is assigned based on a predetermined operation in the input device by a user.

5. The print target data processing apparatus according to claim 1, wherein the processor generates plural image files by dividing the print target data into plural pieces of data and correlates the generated plural image files to one another.

6. The print target data processing apparatus according to claim 1, wherein the processor determines the pixel pitch of pixels constituting the specific object portion at a time of printing the specific object portion in the actual size on the print media, based on the actual size of the specific object.

7. The print target data processing apparatus according to claim 1, wherein the processor determines the pixel pitch of pixels constituting the specific object portion at the time of printing the specific object portion in an actual size of a specific object corresponding to the specific object portion on the print media, based on the number of pixels constituting the image data and the ratio of the specific object to the image.

8. The print target data processing apparatus according to claim 1, wherein the processor further generates an image file including related information which is relevant to the print target data.

9. The print target data processing apparatus according to claim 8, wherein the processor further generates the image file in which a size of the related information is changed, based on the specified print size.

10. The print target data processing apparatus according to claim 1, wherein the processor obtains, from the printer, the size of the print media with which the printer can perform printing, and specifies the obtained size.

11. The print target data processing apparatus according to claim 1, further comprising:
an input device,
wherein the processor specifies the size of the print media, which size is assigned based on a predetermined operation in the input device by a user.

12. The print target data processing apparatus according to claim 1, wherein:
the processor generates plural image files so that positional information of a divided image therein with respect to the print target data is included in each of the plural image files, and
the processor carries out control to store in the file memory the plural image files including the generated respective positional information.

13. The print target data processing apparatus according to claim 12, wherein the data of the divided image includes an overlap width portion corresponding to the positional information.

14. The print target data processing apparatus according to claim 1, wherein the processor generates a file for the print target data, the print target data including print information for being printed on the print media of the specified size as a print condition for a printer, when the print target data is judged not to be divided into the plural print media.

15. A method for processing print target data by using a print target data processing apparatus, the method comprising:
- an obtaining processing to obtain print target data which is to be printed;
- a first specifying processing to specify a print size for printing the print target data obtained by the obtaining processing on one or more print media;
- a second specifying processing to specify a size of the print media on which the print target data is printed;
- a judging processing to judge whether or not the print target data is divided into the plural print media when being printed, based on the print size specified by the first specifying processing and the size of the print media specified by the second specifying processing;
- a first determining processing to determine a pixel pitch of pixels constituting the print target data at a time of printing the print target data in the specified print size on the print media; and
- a second determining processing to determine a pixel pitch of pixels constituting a specific object portion at a time of printing the specific object portion in the specified print size on the print media, based on a number of all pixels constituting the print target data and a ratio of the specific object portion to an image.

16. A non-transitory computer readable storage medium having stored thereon a program that is executable by a computer of a print target data processing apparatus, the program being executable by the computer to cause the computer to perform functions comprising:
- an obtaining function to obtain print target data which is to be printed;
- a first specifying function to specify a print size for printing the print target data obtained by the obtaining function on one or more print media;
- a second specifying function to specify a size of the print media on which the print target data is printed;
- a judging function to judge whether or not the print target data is divided into the plural print media when being printed, based on the print size specified by the first specifying function and the size of the print media specified by the second specifying function;
- a first determining function to determine a pixel pitch of pixels constituting the print target data at a time of printing the print target data in the specified print size on the print media; and
- a second determining function to determine a pixel pitch of pixels constituting a specific object portion at a time of printing the specific object portion in the specified print size on the print media, based on a number of all pixels constituting the print target data and a ratio of the specific object portion to an image.

* * * * *